United States Patent [19]

Grützmacher et al.

[11] Patent Number: 4,903,940

[45] Date of Patent: Feb. 27, 1990

[54] DEVICE FOR POSITIONING AN ADJUSTING MEMBER

[75] Inventors: Bertold Grützmacher, Schriesheim; Peter T. Blaser, Dielheim, both of Fed. Rep. of Germany

[73] Assignee: Heidelberger Druckmaschinen AG, Heidelberg, Fed. Rep. of Germany

[21] Appl. No.: 142,992

[22] Filed: Jan. 12, 1988

[30] Foreign Application Priority Data

Jan. 15, 1987 [DE] Fed. Rep. of Germany ....... 3700971

[51] Int. Cl.[4] ................ F16K 31/06

[52] U.S. Cl. ................ 251/129.16; 91/47

[58] Field of Search ................ 91/47; 251/129.16

[56] References Cited

U.S. PATENT DOCUMENTS

| | | | |
|---|---|---|---|
| 2,947,284 | 8/1960 | Nicholson | 91/47 |
| 3,410,519 | 11/1968 | Evans | 251/129.16 |
| 3,430,536 | 3/1969 | Oelrich | 91/47 |
| 4,361,073 | 11/1982 | Oelrich et al. | 91/47 |

FOREIGN PATENT DOCUMENTS

| | | |
|---|---|---|
| 825048 | 7/1949 | Fed. Rep. of Germany . |
| 2423516 | 11/1975 | Fed. Rep. of Germany . |
| 2926996 | 1/1981 | Fed. Rep. of Germany . |
| 3047209 | 7/1982 | Fed. Rep. of Germany . |
| 3141773 | 9/1982 | Fed. Rep. of Germany . |
| 3121335 | 12/1982 | Fed. Rep. of Germany . |
| 2223580 | 10/1974 | France . |

OTHER PUBLICATIONS

German reference "Ölhydraulik und Pneumatik", 29, 1985, No. 8, pp. 604–607, FIG. 9 pertaining to text.

German reference "Technische Rundschaus", 48/85, pp. 28–40, FIG. 2 pertaining to text.

German reference "Ölhydraulik und Pneumatik", 22, 1978, No. 22, pp. 435–438, FIG. 1*b*.

*Primary Examiner*—Arnold Rosenthal

*Attorney, Agent, or Firm*—Herbert L. Lerner; Laurence A. Greenberg

[57] ABSTRACT

Device for positioning an adjusting member which includes a pneumatic adjusting cylinder and an electromagnetically actuated valve operating in a low-wattage range for controlling aeration and venting, respectively, of the adjusting cylinder, comprising an electromagnetic system as well as an armature plate serving simultaneously, as a valve member for venting the cylinder, the armature plate being displaceable from a position thereof at which it defines a maximum air gap with the electromagnetic system to a position thereof at which it defines a zero air gap with the electromagnetic system in an excited condition of said electromagnetic system, said electromagnetic system in said excited condition thereof closing the cylinder against venting, and in the unexcited condition thereof opening the cylinder for venting.

3 Claims, 1 Drawing Sheet

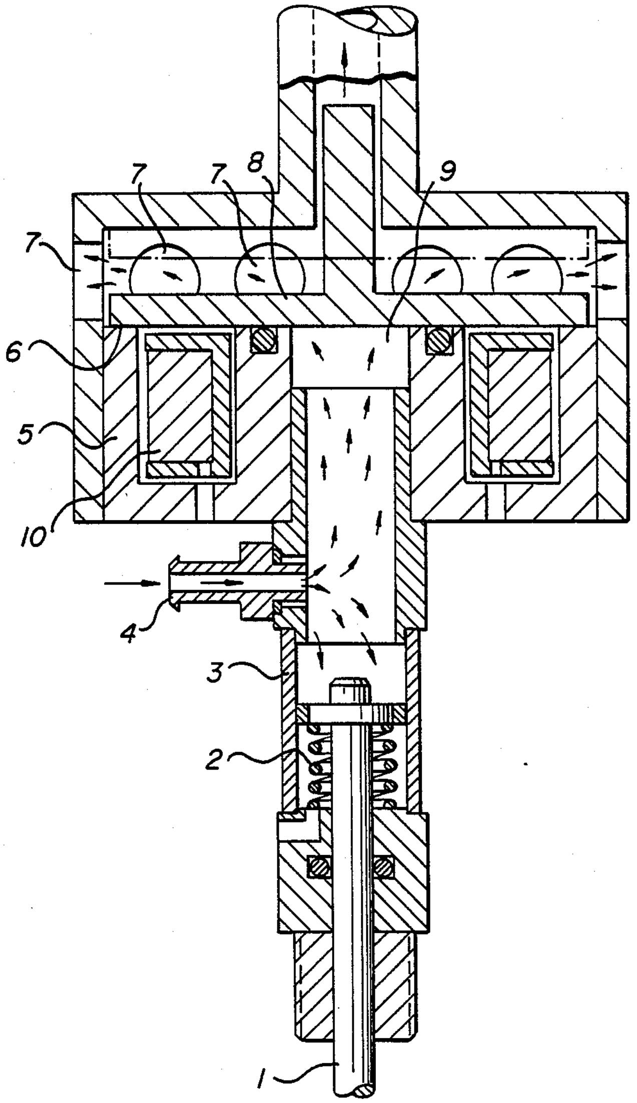
7
7
8
9
7
6
5
10
4
3
2
1

DEVICE FOR POSITIONING AN ADJUSTING MEMBER

The invention relates to a device for positioning an adjusting member, including a pneumatic adjusting cylinder and an electromagnetically actuated value operating in a low-wattage range for controlling venting of the adjusting cylinder.

When a pneumatic adjusting cylinder is activated i.e. when an adjusting cylinder is filled with air, and when air in an adjusting cylinder is vented, respectively, certain delay periods occur before the adjusting cylinder arrives at its desired position.

There is a predominant preoccupation in the art, therefore, to shorten the reaction time of the adjusting cylinder in order to assure more rapid positioning of the adjusting cylinder.

In order to realize shorter delay periods, the cross section for the feed air and for venting, respectively, are given a suitably large dimension i.e. the valve for controlling the air feed as well as the air venting is provided with a suitably large construction. Due to these measures, it is possible, for example, to achieve a very rapid venting and, thereby, a brief delay time period.

A large cross section, however, has a disadvantageous effect upon the control of the respective feeding and venting in relation to the power to be applied by the electromagnetic system.

An opening of relatively large dimensions for cylinder air feeding and venting requires a large valve member or plunger having suitable power. In heretofore known systems, the power which is necessary to be applied increases with the size of the flow through or through put, so that the electromagnetic system must be constructed or designed accordingly. Direct control of the electromagnetic system is not possible with computer output signals, because the power of these signals is insufficient to produce the corresponding holding force in the electromagnetic system. In order, therefore, to attain control of the valve which depends upon the output signals of a computer, energy must be generated and supplied in a costly manner.

In order to avoid very intense excitation currents, it has become known heretofore to provide the actuating coils of the electromagnetic system with a large number of turns. Due to this measure, the power which is required to be applied is reduced under certain circumstances. It has been found to be disadvantageous that with the increased number of turns in the actuating coil, the inductivity of the coil is also very greatly increased. The resultant high inductivity, in turn, effects an electrical delay which results in an increase in the total reaction time of the adjusting member. Another heretofore known possibility for controlling air feeding and venting valves, respectively, results from pneumatic anticipatory control technology. In this regard, actuation of the electromagnetic system is enabled indirectly via a pneumatic auxiliary value. In this case, the dead or idle time resulting from the pneumatic anticipatory control has been found to be disadvantageous, because this dead or idle time increases the total reaction time.

It is accordingly an object of the invention to provide a pneumatic adjusting cylinder which is controllable by a low-power electric signal (computer output signal) so that delay time periods which are as brief as possible are produced, and so that a predetermined position is assumed also in the event of a power failure.

With the foregoing and other objects in view, there is provided, in accordance with the invention, a device for positioning an adjusting member which includes a pneumatic adjusting cylinder and an electromagnetically actuated valve operating in a low-wattage range for controlling aertion and venting, respectively, of the adjusting cylinder, comprising an electromagnetic system as well as an armature plate serving simultaneously, as a valve member for venting the cylinder, the armature plate being displaceable from a position thereof at which it defines a maximum air gap with the electromagnetic system to a position thereof at which it defines a zero air gap with the electromagnetic system in an excited condition of said electromagnetic system, said electromagnetic system in said excited condition thereof closing the cylinder against venting, and in the unexcited condition thereof opening the cylinder for venting.

The construction of the armature plate as a valve member affords a completely functional dependence of the valve upon the reaction of the armature. This invention functional dependence offers the advantage that the valve can be controlled by means of the electromagnetic system.

The integration into the electromagnetic system of the armature plate constructed as a valve member in a manner that the air gap, which is located between the armature plate and the electromagnetic system and which impedes or hinders the magnetic flux, is reduced from a maximum to zero width advantageously permits a relatively greater electromagnetic holding force to act upon the armature when the excitation power is relatively small. This reduction of excitation power offers a further advantage in that the electromagnetic system can be controlled directly by a computer output signal and in that no additional energy for producing the holding power need be supplied. By optimizing the magnetic flux, the supply of energy to the electromagnetic system can be reduced without adversely affecting the required holding power. Likewise, the possibility arises of utilizing the energy already at hand for increasing the internal pressure in the pneumatic cylinder. Furthermore, the air outlet opening, which is kept closed by the venting valve member during the pressure increase in the cylinder, can be increased in size without the valve member being forcibly opened due to the internal pressure of the cylinder which is applied to the valve member and because the opposing force is too small. This created possibility of larger dimensioning of the air outlet opening has a very advantageous effect upon the shortening of the venting time period.

Activation of the cylinder venting due to the deenergization of the electromagnetic system offers a marked advantage in that, in the event of an electric power failure, the pneumatic cylinder can nevertheless vent automatically, which also has an effect especially on the reliability aspects of the invention.

The possibility of rapid venting further includes therewith the advantage that, when a fault occurs in the machine and in the machine adjustment, respectively, and the like, the corresponding adjusting member can be returned without delay into the starting position thereof from the operating position thereof.

By suitably constructing the pneumatic cylinder, the exact reverse operation is realizable wherein the adjusting member is driven into the operating range thereof when venting occurs.

The technical teaching introduced by the invention of the instant application is applicable not only to small-volume but also to high-volume pneumatic cylinders. Above all, in the case of high-volume cylinders, slower venting results in relatively long delay times.

In accordance with another feature of the invention the adjusting cylinder is formed with an outlet opening uncoverable by the valve member for venting the cylinder in the unexcited condition for the electromagnetic system, the outlet opening having a cross sectional area matched to a maximum holding force applicable to the valve member by the electromagnetic system.

With such a construction, the outlet opening of the cylinder is of such dimension that the power which is available is just sufficient to produce the required holding force for reliably pressing the valve member against the electromagnetic system.

The maximum dimensioning of the outlet opening has a very advantageous effect upon the shortening of the venting time.

In accordance with a concomitant feature of the invention, the device includes an air discharge channel system formed with a plurality of openings communicating with the valve for venting the adjusting cylinder.

In order to ensure a rapid air discharge or venting after the venting valve is opened, the venting channel system has a total cross section which is larger than the cross section of the outlet opening of the cylinder.

Other features which are considered as characteristic for the invention are set forth in the appended claims. Although the invention is illustrated and described herein as embodied in a device for positioning an adjusting member it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing which is a longitudinal sectional view of a device for positioning an adjusting member constructed in accordance with the invention.

Referring now to the figure of the drawing, there is shown therein a pneumatic adjusting or operating cylinder 3 having a piston rod 1 in the interior thereof and displaceable therein in accordance with a quantity of air fed into the adjusting cylinder 3. The pneumatic adjusting cylinder 3 is additionally provided with a connecting pipe or union 4 through which the air is fed into the adjusting cylinder 3. The piston rod 1 located in the interior of the adjusting cylinder is provided with a return spring 2 which restores or forces the piston rod 1 back again into its starting position after the adjusting cylinder has been deaerated, or the air therein has been vented. Venting of the air or deaerating of the adjusting cylinder 3 is effected via a valve member 8 which is located at an end face of the adjusting cylinder 3 disposed opposite the piston rod 1. The valve member 8 is constructed so as to serve simultaneously as the armature plate for an electromagnetic system 5. For the excited condition of the electromagnetic system 5. The valve member 8 is drawn to and held by a magnetic field generated by an electromagnetic field coil 10 of the electromagnetic system 5. The valve member 8 then simultaneously prevents the air in the adjusting cylinder 3 from flowing out. When the electromagnetic system 5 is excited, the valve member 8 is interposed into the electromagnetic system 5 so that no air gap which hinders the magnetic-flux in the electromagnetic system 5 is formed. De-energization of the electromagnetic system 5 produces a decrease in the electromagnetic holding force with the result that the valve member 8 is no longer attracted or drawn to the field coil 10 of the electromagnetic system 5.

The air pressure prevailing in the interior of the adjusting cylinder 3 is subjected no longer to any resistance from the valve member 8, so that the valve member 8 suddenly yields to or falls back under the air pressure and clears the path for venting the air. The air escapes from the adjusting cylinder 3 via the outlet opening 9 which had been closed theretofore by the valve member 8 and is discharged to the surroundings via an exhaust air channel system formed of bores 7. Due to the fact that the cross sectional area of the opening 9 is many times greater than the cross sectional area of the union or connecting pipe 4, the feeding of air through the latter into the adjusting cylinder 3 during the venting operation has no effect upon the functioning or operation of the device according to the invention.

The foregoing is a description corresponding in substance to German Application P 37 00 971.0, dated Jan. 15, 1987, the International priority of which is being claimed for the instant application, and which is hereby made part of this application. Any material discrepancies between the foregoing specification and the aforementioned corresponding German application are to be resolved in favor of the latter.

What is claimed:

1. Device for positioning an adjusting member which includes a pneumatic adjusting cylinder and an electromagnetically actuated valve operating in a low-wattage range for controlling aeration and venting, respectively, of the adjusting cylinder, comprising an electromagnetic system as well as an armature plate serving simultaneously, as a valve member for venting the cylinder, said armature plate being displaceable from a position thereof at which it defines a maximum air gap with said electromagnetic system to a position thereof at which it defines a zero air gap with said electromagnetic system in an excited condition of said electromagnetic system, said electromagnetic system in said excited condition thereof closing the cylinder against venting, and in said unexcited condition thereof opening the cylinder for venting.

2. Device according to claim 1 wherein the adjusting cylinder is formed with an outlet opening uncoverable by said valve member for venting the cylinder in said unexcited condition for said electromagnetic system, said outlet opening having a cross sectional area matched to a maximum holding force applicable to said valve member by said electromagnetic system.

3. Device according to claim 1 including an air discharge channel system formed with a plurality of openings communicating with the vale for venting the adjusting cylinder.

* * * * *